(12) United States Patent  
Kanerva

(10) Patent No.: US 6,940,451 B2  
(45) Date of Patent: Sep. 6, 2005

(54) PROVISION OF NAVIGATION INFORMATION

(75) Inventor: Mikko J. O. Kanerva, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/611,677

(22) Filed: Jul. 2, 2003

(65) Prior Publication Data

US 2004/0160359 A1 Aug. 19, 2004

Related U.S. Application Data

(60) Provisional application No. 60/447,751, filed on Feb. 19, 2003.

(51) Int. Cl.[7] ............................. G01S 5/02; H04B 7/185
(52) U.S. Cl. ................................. 342/357.08; 701/208
(58) Field of Search ...................... 342/357.06, 357.08, 342/357.13; 701/208, 209, 210, 211, 213

(56) References Cited

U.S. PATENT DOCUMENTS 5,344,105 A * 9/1994 Youhanaie ................. 244/3.14

6,463,374 B1 * 10/2002 Keller et al. ................. 701/50
2004/0024524 A1 * 2/2004 Miyazawa ................... 701/211
2004/0059497 A1 * 3/2004 Sankrithi ..................... 701/120

FOREIGN PATENT DOCUMENTS

| JP | 10132595 3 | 5/1998 |
| JP | 2001317953 | 11/2001 |
| WO | WO 9601531 | 1/1996 |

* cited by examiner

*Primary Examiner*—Dao Phan  
(74) *Attorney, Agent, or Firm*—Squire, Sanders & Dempsey L.L.P.

(57) ABSTRACT

An apparatus and method for provisioning of a user with navigation guidance is provided. The user is a user of a first user equipment configured for wireless communication. In the method location information regarding a second user equipment also configured for wireless communication is generated while the second user equipment moves along a path of movement. Navigation information is then generated based on the location information substantially in real-time. Navigation guidance is presented by means of the first user equipment based on the generated navigation information for enabling the user of the first user equipment to follow the second user equipment.

27 Claims, 3 Drawing Sheets

PROVISION OF NAVIGATION INFORMATION

CROSS-REFERENCE TO RELATED APPLICATIONS

This application claims priority of U.S. Provisional Application Serial No. 60/447,751 entitled, "Provision of Navigation Information," filed Feb. 19, 2003, the entire contents of which are incorporated herein by reference.

BACKGROUND OF THE INVENTION

1. Field of the Invention

The present invention relates to provision of navigation guidance for a mobile user. The navigation guidance may be, for example, a mobile user provided with information regarding a path of movement of another mobile user so that the mobile user may follow the other mobile user.

2. Description of the Related Art

Navigation may be required in various situations. For example, a person who wants to travel to a location from another location needs typically to do at least some navigation such as orienteering and/or selection of streets or roads in order to know which direction he/she should move to in order to arrive at the destination. Navigation aids such as compasses and/or maps and so on are known. The general concept of navigation as well as conventional navigation aids are well known, and are thus not discussed herein in more detail.

In addition to conventional maps and compasses, other navigation aids have also been developed. For instance, electronic maps have been introduced. Electronic navigator devices are also available. One of the recent developments in the field of electronic navigation aids include a handheld GPS (Global Positioning System) navigator. The GPS is based on the use of satellites. The arrangement being such that a GPS device on the ground determines its location based on signals received from the satellites of the GPS system. The GPS devices are popular amongst various user groups, and are used by both private and professional users. A similar satellite based system known as 'Galileo' has also been proposed.

Mobile communication systems providing mobility for the users thereof are also known. A well-known example of such mobile communication systems is the public land line mobile network (PLMN), of which cellular communications networks are an example. Another example is a mobile communication system that is based, at least partially, on use of communication satellites. Mobile communication system can be used in determining the location of a mobile user and also in provision of location information to various clients. Provision of location information by means of a mobile communications system can be implemented in various ways.

In accordance with a possibility the Global Positioning System (GPS) navigator or a similar positioning device may be integrated in or connected to a communications device of a mobile communication system. In this specification the term 'GPS mobile station' (GPS-MS) is used for simplicity to denote such an integrated device, the device being provided with GPS positioning functionality and a mobile station.

However, different positioning technologies than the above referenced satellite based GPS or Galileo can also be used. It is possible that the mobile device does not measure the location itself. Instead, the location determination may be accomplished, at least partially, at the network side with or without any assistance from the mobile device. Thus the position information may be provided, at least partially, by means of apparatus associated with the mobile telecommunication network. The basic principles and operation of a network based locations service are known by the skilled person, and will thus not be discussed in any greater detail. It is sufficient to note that a location service (LCS) server entity may manage the location services. The LCS server is for gathering and storing various information that may be used in provision of location information for location service clients (LCS clients).

The more recent LCS applications are such that they utilize information from various sources, such as from location measurement units of the network and mobile stations. The location service entity associated with the communication system may thus be adapted to utilize the information provided by the satellite based positioning system and/or the mobile station. The LCS based positioning may be based entirely or only partially on the information from the satellite based system and/or the mobile station.

The location service (LCS) client may make use of that location information for various services/applications. A possible application comprises a LCS client arranged to provide location information in response to a request for non-call related location information regarding a target mobile station by another mobile station. Thus it is possible for a user of a mobile station to receive information regarding the location of another i.e. target mobile station.

The information regarding the route a mobile user has taken can be used, for example, by other users for navigation purposes. Such information is believed to be useful in various occasions. For example, if a mobile user wants to follow a target mobile user to destination, it might be advantageous if such user can receive the information regarding the actions he/she needs to take to be able to follow the route taken by the target user. However, even if the user knows the final destination of the target mobile station, the user does not necessarily know the route the target user took to arrive at the destination. The user may also wish to receive additional information regarding the movements of the target mobile station.

If the target mobile user turns left or right e.g. at an intersection, the following user may not become aware that he/she should do the same. The present arrangements do not allow communication of this type of following information quick enough so that the following user can follow the target mobile user. The following user and the target mobile user may need to otherwise communicate this information from one to other, for example by establishing a voice call or sending a text message. If the following user is traveling far behind the target user, several turns or intersections may "separate" them, and communicating, keeping track of and remembering the maneuvers may prove to be difficult, especially if the following user is driving. The following user might also wish to receive other information. For example, the following user might wish to receive information if the target user has stopped (e.g. for refuelling), or is wandering about (e.g. to find an address, shop, filling station etc.) and so on.

SUMMARY OF THE INVENTION

Embodiments of the invention aim to address one or more of the above problems and to provide an arrangement the route taken by a moving mobile station can be reproduced in substantial real-time.

According to one embodiment of the invention, there is provided a method of providing a user of a first user equipment with navigation guidance, the first user equipment being configured for wireless communication. The method comprises generating location information regarding a second user equipment configured for wireless communication while the second user equipment is moving along a path of movement, generating navigation information based on the location information substantially in real-time; and presenting navigation guidance by means of the first user equipment based on the generated navigation information for enabling the user of the first user equipment to follow the second user equipment.

According to another embodiment of the invention there is provided a communication system comprising at least one transceiver for wireless communication with mobile user equipment. The communication system comprises positioning means for generating location information regarding a mobile user equipment while the mobile user equipment is moving along a path of movement, controller for generating navigation information based on the location information substantially in real-time; and an user interface for presenting navigation guidance for a mobile user based on the generated navigation information for enabling the mobile user to follow the mobile user equipment.

According to another embodiment of the invention there is provided a mobile user equipment adapted for wireless communication. The mobile user equipment comprises means for receiving location information regarding a second mobile user equipment that is moving along a path of movement, controller for generating navigation information based on the received location information substantially in real-time, and a user interface for presenting navigation guidance for a mobile user based on the generated navigation information for enabling the mobile user to follow the second mobile user equipment.

In more specific forms of the invention the navigation guidance is presented as a path of movement of the second user equipment to the user of the first user equipment. The presentation occurs preferably substantially in real-time. Alternatively or in addition, the guidance may be in form of instructions to the user of the first user equipment.

The navigation information may be generated in the first user equipment or in an element of a communications network.

The location information may be generated at the second user equipment or in an element of a communications network.

The embodiments of the invention may provide a solution wherein information regarding the route taken by a user of a target mobile station can be utilized e.g. by another mobile user such that the other user may follow the route taken by the target mobile station. Information regarding the route of the target mobile station can be provided in substantial real-time manner such that e.g. the following mobile user may follow the same route even if the following user is far behind the target user.

BRIEF DESCRIPTION OF THE DRAWINGS

For better understanding of the present invention, reference will now be made by way of example to the accompanying drawings in which.

DETAILED DESCRIPTION OF THE PREFERRED EMBODIMENTS

Figure 1:
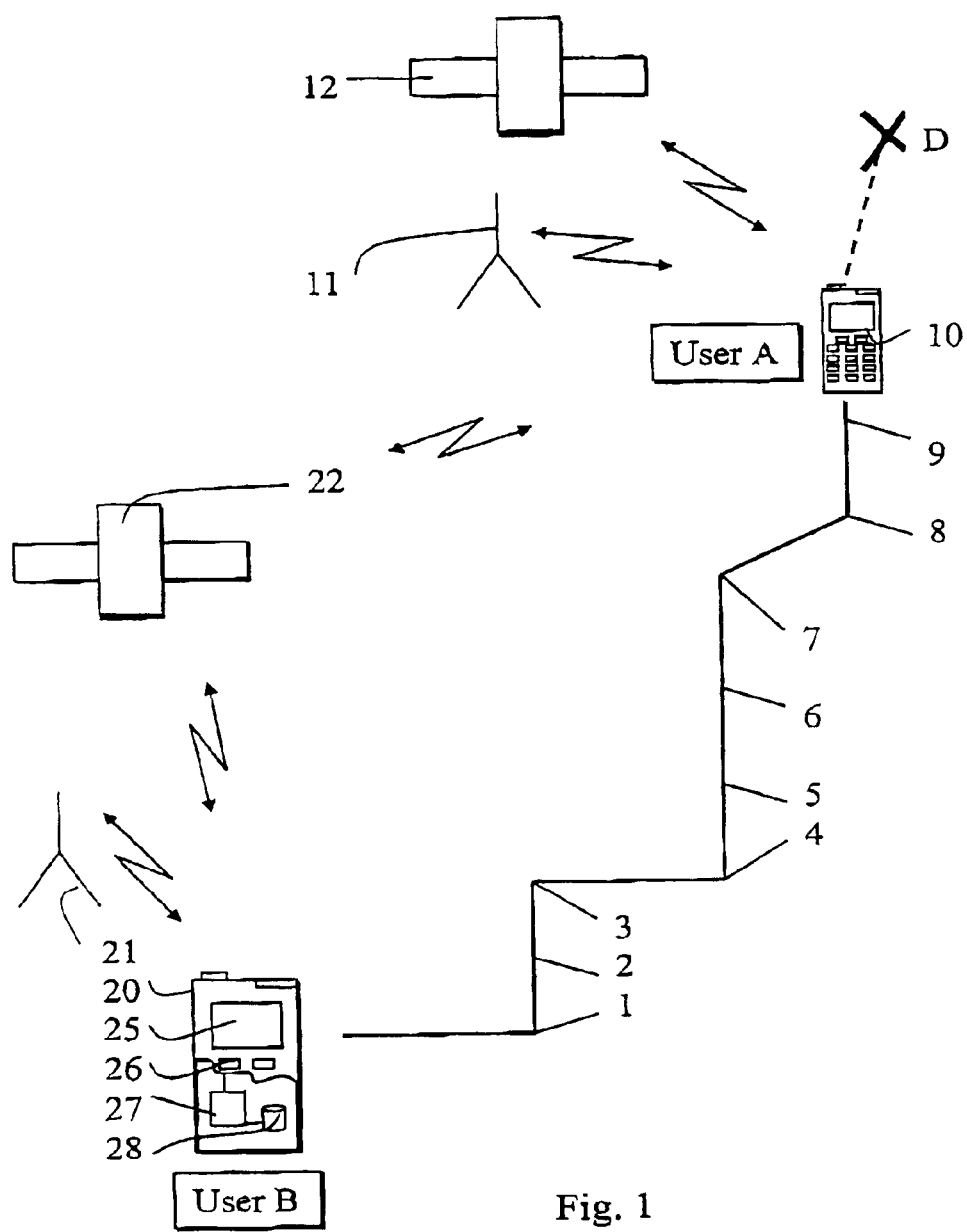
FIG. 1 shows one embodiment of the invention.

Reference is first made to FIG. 1 which shows two mobile stations 10 and 20 and two base stations 11 and 21 of a mobile communication system. Two satellites 12 and 22 of a satellite positioning system are also shown. Users of the mobile stations 10 and 20 are designated by boxes denoted as 'user A' and 'user B', respectively.

One skilled in the art is familiar with the operational principles and various possible elements of a mobile communication system and is also familiar with the operation and elements of the satellite based positioning systems, such as the GPS. Therefore these features are not explained in any greater detail. It is sufficient to note that the mobile communication system allows mobility to the users thereof by enabling wireless communication between the user equipment i.e. the mobile stations 10, 20 and the base stations 11, 21 of the communication network. The GPS system is based on the use of orbiting satellites 12, 22 and signals received by GPS enabled devices from the satellites.

One skilled in the art is also aware of how a mobile station operates. It is therefore not necessary to explain the operation thereof in any great detail. From the point of view of the FIG. 1 embodiment, it is sufficient to mention that at least mobile station 10 is an integrated device provided with GPS functionality and a mobile station functionality. More particularly, the mobile station 10 of user A is adapted to generate position information based on signals from the GPS satellites 12,22. The mobile station 10 is also adapted to send information concerning its location to the mobile station 20 of user B via the mobile communication system.

The transmission of information may occur by means of any appropriate communication technique, such as by means of a short message system (SMS) message, a multimedia messaging system (MMS) message, or any other data messaging system. Both mobile stations may support an appropriate packet data transmission technique, such as General packet Radio service (GPRS) or any third generation (3G) mobile telecommunications protocol.

In the FIG. 1 embodiment the functionalities for offering navigation guidance for user B can be implemented in the mobile station 20. The mobile station 20 is provided with processor means 27 and data storage means 28. The processor means is configured to process information regarding the location of the mobile station 10. The storage means is configured to store information associated with the location of the mobile station 10. The stored information may be processed by the processing means 27 and/or information received e.g. via the base station 21. The user B may control the operation of the mobile station 20 by means of control keys 26. The user B may be displayed guidance such as information regarding the route taken by User A or other information by means of a display 25.

Processing of the location information to generate navigation guidance at the mobile station 20 may be advantageous in various occasions. For example, by means of this any new standardization of the functions of the network can be avoided. Furthermore, new network elements are not necessarily required. Thus the operation of the navigation guidance system can be implemented without involvement by the network operators.

The two users A and B are travelling to the same destination D. The users may be, for example, in different cars (not shown for simplicity), separated by only by a few minutes' drive. The leading i.e. target user (user A) may want to indicate to the following user (user B) the route he is taking. As mentioned, the two GPS-MS units may be adapted to allow the users to exchange location information.

By means of location information received from the mobile station 10 the mobile station 20 of user B may then determine the route taken by user A. After generation of the route the mobile station 20 may give instructions to user B how to follow the route. The guidance may take various forms. For example, an electronic map covering the area between users A and B may be displayed to User B, User B may be given instructions regarding the next intersection and so on.

The exchange of location information and subsequent determination of the route of User A preferably occurs substantially in real-time. The transmission of information and route determination may be triggered by any appropriate event, as will be explained in more detail below.

Figure 2:
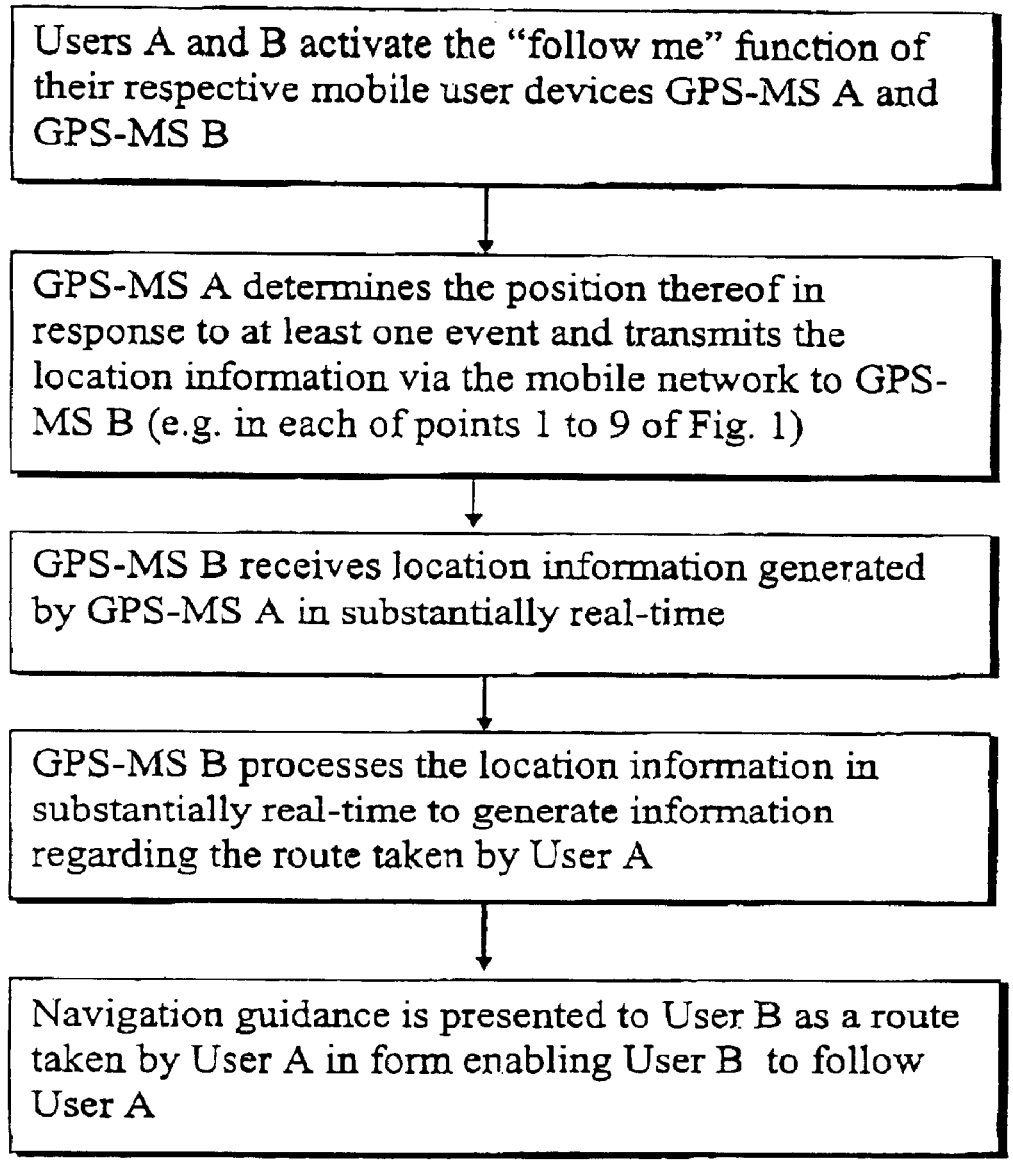
FIG. 2 is a flowchart illustrating the operation of one embodiment of the invention.

The operation of the FIG. 1 embodiment will now be described in more detail with reference also to the flow chart of FIG. 2. Initially, users A and B may activate the route information provision functionality in their respective mobile stations 10, 20. After the activation information regarding the position of user A is transmitted to the mobile station 20 of user B.

Determination and possible subsequent sending of information regarding the position of the target mobile station may occur in response to at least one predefined event. The receiving end of the transmission may then generate the route of User A. This can be done by combining information from subsequent location information determinations triggered by the subsequent events.

The transmission of information and route determination may be triggered by any appropriate event. Such an event may comprise an event such as expiry of a timer at regular time intervals or with specified irregular intervals, travel of a predetermined distance at regular distance intervals or at irregular specified distances, passing of a predetermined location, when the direction or velocity of user A changes more than a certain threshold, meeting of any other predefined criteria and/or when the car stops or has problems and so on. Either of the users A and/or be may also activate the location information determinations and transmission process by means of the user interface of their respective mobile stations 10 and 20.

The information transmission may be triggered by only one type of an event (e.g. expiry of a timer) or by various types of events.

The sending process may be activated only after the user A has started moving. That is, even though the location determination may occur in response to a timer or another event, no information is transmitted unless the position of the target mobile station has changed or User A is determined to be moving (i.e. User A's velocity is other than zero).

In FIG. 1 the transmission is triggered at each of the location points 1 to 9. At location points 1, 3, 4, 7 and 8 the transmission is triggered by a change in the direction of movement. At points 2, 5, 6 and 9 the triggering event constitutes the lapse of a predefined time interval.

The principles for triggering the sending of the position information may be similar to the procedure of creation and storage of the so called tracks in the prior art GPS units. However, one difference in comparison to conventional systems is that in the prior art the tracks are created and stored in the moving target unit, and not transmitted to another device. The route information is not generated in substantially real-time in the other device.

The route i.e. the path of movement of the target mobile station 10 is then generated at the following mobile station 20 based on location information at points 1 to 9. The mobile station 20 can store or use the transmitted data as such, or do its own filtering and other processing. For example, if the mobile station 10 transmits data every 10 seconds but follows a straight line, the mobile station 20 does not necessarily have to store all points. In FIG. 1 it may not be necessary to store and process at mobile station 20 information regarding points 2, 5 and 6.

It should also be appreciated that the route generation is preferably a dynamic process and that the generated route is preferably updated every time new location data is received from the target mobile station 10. If the location information has not changed or if the velocity of mobile station 10 is low, it is possible to wait for another location information message before the update.

The amount of transmissions and/or location determinations and/or processing in the following mobile station 20 may be reduced by intelligent selection of triggering points.

The location information may include information regarding the latitudes and longitudes of mobile station A. Altitude information may also be included. Information regarding directional vectors may also be utilized. Other data such as information regarding the speed, acceleration, direction, car status (fuel level, engine temperature, oil pressures and so on), presence and so on may also be transported.

From the above, speed information allows user B to realize more quickly that user A has stopped and is preparing to stop as well. Car status information can be used to indicate that the other party has a problem. For example, if user A stops, this may be due various reasons. Based on the further information it is possible to determine if the user A has stopped because he/she is already at the destination D, re-fuelling, has engine problem, rests, is looking for e.g. a filling station or has got lost, has stopped for a lunch and so on.

Similar information of user B can be transmitted to user A, to keep him aware of how user B progresses.

The mobile station 20 may acknowledge to the mobile station 10 that it has received the position information. If the acknowledgement is not received within a predefined time, the mobile station 10 may resend the information.

In FIG. 1 the position information is first determined by the mobile station 10, then transmitted in substantially real-time on a wireless interface between the mobile station 10 and the base station 11 and then on a wireless interface from the base station 21 to the mobile station 20. However, this is not the only type of possible operation.

Figure 3:
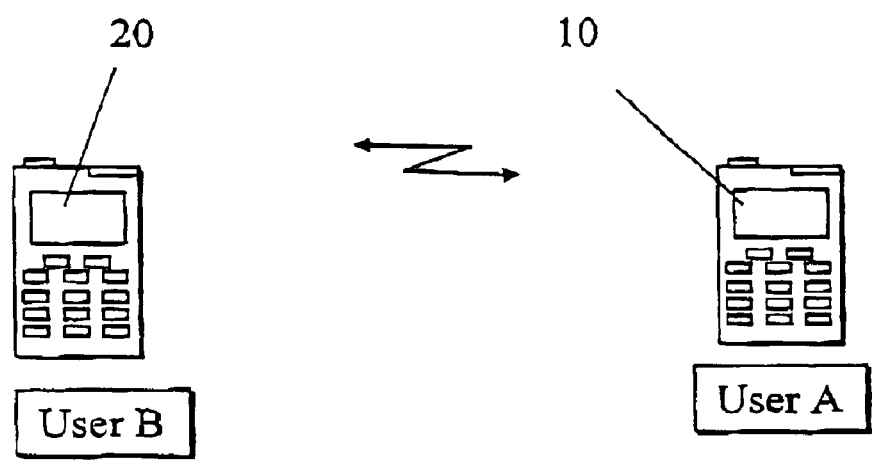
FIG. 3 shows an alternative embodiment.

As shown by FIG. 3, it is possible to transmit the information directly between the two mobile stations 10 and 20, e.g. by means of a local or short range radio link (SRRL). Bluetooth™ is an example of protocols enabling such links. Another example of systems enabling direct wireless links between the mobile station is the so called Family Radio System (FRS).

The above discussed the possibility of using GPS data and location determination at the mobile station 10. It should be appreciated that any appropriate technique can be used for the provisioning of the required location information.

At least a part of the location information determination may be accomplished at the network side by means of a location service (LCS) facility of the network. The LCS entity of the network may accomplish the location determination in its entirety based on information from the network. In this approach, the cells or similar geographically limited radio access entities and associated controllers of the communication system are utilized in production of at least a rough estimate of the current location of the mobile user equipment. To improve the accuracy of the location information the communication system may be provided with specific location measurement units that provide more accurate information concerning the location of user equipment within the service area of the cellular system. It is also possible to ascertain a geographical location when the mobile user equipment is located within the coverage area of a visited or "foreign" network. The network based location determination may be at least partially assisted by information from the target mobile station.

The mobile station 20 may also use additional information for provision of navigation guidance. For example, an electric map data may be used to create a map on which the route of user A is displayed. The coordinates or other indication of the destination may be given to the mobile station 20 as a basic data.

User A may also send additional information or messages like "do not follow this route", "I've reached a dead end", "I have stopped for coffee" and so on. The mobile station 10 of User A may also generate information based on a point on its own map system. For example, User A may define the points from which locations information should be sent to User B.

The mobile station 20 may also correct the determined route based on the additional information. For example, if the mobile station determines that the route taken by the target user is not exactly on top of a feasible route on an electronic map (does not exactly follow a road), the route displayed to User B may be so corrected.

The mobile station 10 or 20 may be adapted with additional intelligence e.g. to verify if the user thereof is heading in the right direction and/or if the user is deviating from a predefined path of movement between a starting location and a destination location. The mobile station may be adapted to alert the user if he/she or the target user is off the course or if the target user is moving towards a wrong direction.

It may occur that the following mobile station 20 has not received any new location information regarding the target mobile station 10 even if an intersection or another important location is approaching. The network may be provided with functionality that follows the progress of User B and informs User B that he/she is getting closer to such a location. User B may then, in the absence of any other guidance, e.g. request for the latest location of User A.

It is noted that the above disclosed solution is applicable also in cases other than a car following another. For example, the invention may be found to be useful by hikers, sailors and so on. Furthermore, the information from the target mobile station may used to automatically steer a following mobile device along the same route. For example, in a factory an automatic transportation carriage may follow a route that has been generated based on subsequent position signals received from another carriage. The first or target carriage may be trained by a human operator whilst the following carriages simply follow the same route based on signals received from the first carriage.

It should be appreciated that whilst embodiments of the present invention have been described in relation to mobile stations, embodiments of the present invention are applicable to any other suitable type of user equipment.

Information may be provided to more than one follower, i.e. a group of mobile stations may follow a mobile station. Similarly, a mobile station may follow a plurality of target mobile stations. This could be useful e.g. when a number of users is traveling to the same destination, and the follower wants to obtains information which might be the best route to get there.

It is also noted herein that while the above describes exemplifying embodiments of the invention, there are several variations and modifications which may be made to the disclosed solution without departing from the scope of the present invention as defined in the appended claims.

What is claimed is:

1. A method of providing a user of a first mobile station with navigation guidance, the first mobile station being configured for wireless communication, the method comprising:

generating location information regarding the first mobile station and a second mobile station configured for wireless communication while the second mobile station is moving along a path of movement;

generating navigation information based on said location information substantially in real-time; and presenting navigation guidance by means of the first mobile station based on the generated navigation information for enabling a user of the first mobile station to follow the second mobile station.

2. The method as claimed in claim 1, wherein the step of presenting navigation guidance further comprises presenting the path of movement of the second mobile station in substantially real-time to the user of the first mobile station.

3. The method as claimed in claim 1, wherein the step of presenting navigation guidance further comprises presenting instructions to the user of the first mobile station explaining how to follow the second mobile station.

4. The method as claimed in claim 1, further comprising performing the step of generating the navigation information based on the generated location information in the first mobile station.

5. The method as claimed in claim 1, further comprising transmitting communication of information between the two mobile stations via a communications network.

6. The method as claimed in claim 1, further comprising performing the step of generating the navigation information based on said generated location information in an element of the communications network.

7. The method as claimed in claim 1, further comprising triggering the generation of navigation information by a timer.

8. The method as claimed in claim 1, further comprising triggering the generation of navigation information by a predetermined distance traveled by the second mobile station.

9. The method as claimed in claim 1, further comprising triggering the generation of navigation information by a predetermined change in a direction of movement of the second mobile station.

10. The method as claimed in claim 1, further comprising triggering the generation of navigation information by a predetermined change in the speed of a target mobile station.

11. The method as claimed in claim 1, further comprising associating the second mobile station with a vehicle and triggering the generation of navigation information by a predetermined event relating to an operation of the vehicle.

12. The method as claimed in claim 1, further comprising filtering information in the first mobile station before processing the information further.

13. The method as claimed in claim 1, further comprising storing in the first mobile station said location information regarding the second mobile station and processing at the first mobile station results of at least two location determinations to obtain said navigation information.

14. The method as claimed in claim 1, further comprising storing in the second mobile station said location information regarding the second mobile station and processing at the second mobile station results of at least two location determinations to obtain said navigation information.

15. The method as claimed in claim 1, further comprising transmitting signals from the first mobile station to the second mobile station.

16. The method as claimed in claim 15, further comprising including information regarding the first mobile station within the signals.

17. The method as claimed in claim 1, further comprising generating said location information at the second mobile station.

18. The method as claimed in claim 1, further comprising using information signals from a satellite based positioning system when generating said location information regarding the second mobile station.

19. The method as claimed in claim 1, further comprising utilizing information signals from a positioning system associated with a mobile telecommunication network when generating said navigation guidance.

20. The method as claimed in claim 1, further comprising presenting said navigation guidance by means of a plurality of mobile stations based on said location information regarding the second mobile station.

21. The method as claimed in claim 1, further comprising transmitting communication of information on a wireless interface between the two mobile stations.

22. A communication system comprising at least one transceiver for wireless communication with a first and a second mobile station, the communication system comprising:
    positioning means for generating location information regarding a the first and second mobile stations while the second mobile station is moving along a path of movement;
    controller for generating navigation information based on said location information in real-time; and
    a user interface for presenting navigation guidance for a mobile user of the first mobile station based on the generated navigation information for enabling the mobile user to follow the the second mobile station.

23. A mobile station configured for wireless communication, the mobile station comprising:
    means for receiving location information regarding the mobile station and a second mobile station that is moving along a path of movement;
    controller for generating navigation information based on said received location information in real-time; and
    a user interface for presenting navigation guidance for a mobile user of the mobile station based on the generated navigation information for enabling the mobile user to follow the second mobile station.

24. A communication system comprising at least one transceiver for wireless communication with a first and second mobile station, the communication system comprising:
    positioning means for generating location information regarding the first and second mobile stations while the second mobile station is moving along a path of movement;
    generating means for generating navigation information based on said location information in real-time; and
    presenting means for presenting navigation guidance for a mobile user of the first mobile station based on the generated navigation information for enabling the mobile user to follow the second mobile station.

25. A mobile station configured for wireless communication, the mobile station comprising:
    receiving means for receiving location information regarding the mobile station and a second mobile station that is moving along a path of movement;
    generating means for generating navigation information based on said received location information in real-time; and
    presenting means for presenting navigation guidance for a mobile user of the mobile station based on the generated navigation information for enabling the mobile user to follow the second mobile station.

26. A communication system comprising at least one transceiver for wireless communication with a first and second mobile station, the communication system comprising:
    a positioning device configured to generate location information regarding a the first and second mobile stations while the second mobile station is moving along a path of movement;
    controller configured to generate navigation information based on said location information in real-time; and
    a user interface configured to present navigation guidance for a mobile user of the first mobile station based on the generated navigation information for enabling the mobile user to follow the second mobile station mobile.

27. A mobile station configured for wireless communication, the mobile station comprising:
    a receiver configured to receive location information regarding the mobile station and a second mobile station that is moving along a path of movement;
    a controller configured to generate navigation information based on said received location information in real-time; and
    a user interface configured to present navigation guidance for a mobile user of the mobile station based on the generated navigation information for enabling the mobile user to follow the second mobile station.

* * * * *